United States Patent
Post et al.

(10) Patent No.: US 11,814,065 B1
(45) Date of Patent: *Nov. 14, 2023

(54) INTELLIGENT VEHICLE GUIDANCE FOR IMPROVED DRIVING SAFETY

(71) Applicant: UIPCO, LLC, San Antonio, TX (US)

(72) Inventors: Nathan Lee Post, Rockport, TX (US); Carlos J P Chavez, San Antonio, TX (US); Deborah Janette Schulz, San Antonio, TX (US); Ashley Raine Philbrick, San Antonio, TX (US); Eric David Schroeder, San Antonio, TX (US); Gabriel Carlos Fernandez, San Antonio, TX (US); Snehal Desai, Richardson, TX (US); Rachel Elizabeth Csabi, Frisco, TX (US); Ruthie D. Lyle, Durham, NC (US); Courtney St. Martin, Duluth, GA (US)

(73) Assignee: United Services Automobile Association (USAA), San Antonio, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/514,195

(22) Filed: Oct. 29, 2021

Related U.S. Application Data

(63) Continuation of application No. 17/006,342, filed on Aug. 28, 2020, now Pat. No. 11,180,159.
(Continued)

(51) Int. Cl.
*B60Q 1/00* (2006.01)
*B60W 50/14* (2020.01)
(Continued)

(52) U.S. Cl.
CPC ....... *B60W 50/14* (2013.01); *G08G 1/096791* (2013.01); *G08G 1/161* (2013.01); *B60W 2050/143* (2013.01); *B60W 2050/146* (2013.01); *B60W 2554/402* (2020.02); *B60W 2554/404* (2020.02); *H04W 4/46* (2018.02)

(58) Field of Classification Search
CPC .......... B60W 50/14; B60W 2050/143; B60W 2050/146; B60W 2554/402; B60W 2554/404; G08G 1/096791; G08G 1/161; H04W 4/46
See application file for complete search history.

(56) References Cited

U.S. PATENT DOCUMENTS 7,729,857 B2 * 6/2010 Mudalige ............... G08G 1/163
340/901
9,679,487 B1 * 6/2017 Hayward ............. G05D 1/0214
(Continued)

*Primary Examiner* — Toan N Pham
(74) *Attorney, Agent, or Firm* — Plumsea Law Group, LLC

(57) ABSTRACT

A method and system of intelligently alerting and/or routing vehicles to improve driving safety is disclosed. The method includes sharing data collected by vehicles in different locations to determine whether the presence of dynamically moving objects such as animals and pedestrians will affect traffic conditions for other vehicles on the nearby roadways. If the system determines there is a likelihood of such objects being obstacles to other vehicles, an alert can be automatically presented to the drivers of the impacted vehicles. The method further includes generating routes for the driver that avoid, or limit, the driver's exposure to the obstacle.

20 Claims, 13 Drawing Sheets

Related U.S. Application Data

(60) Provisional application No. 62/894,068, filed on Aug. 30, 2019.

(51) Int. Cl.
  *G08G 1/16* (2006.01)
  *G08G 1/0967* (2006.01)
  *H04W 4/46* (2018.01)

(56) References Cited

U.S. PATENT DOCUMENTS

| | | | |
|---|---|---|---|
| 9,903,733 B2* | 2/2018 | Bai | G08G 1/0112 |
| 10,982,968 B2* | 4/2021 | Elangovan | G01C 21/3647 |
| 2014/0354684 A1* | 12/2014 | Beckwith | G06F 3/011 |
| | | | 345/633 |

* cited by examiner

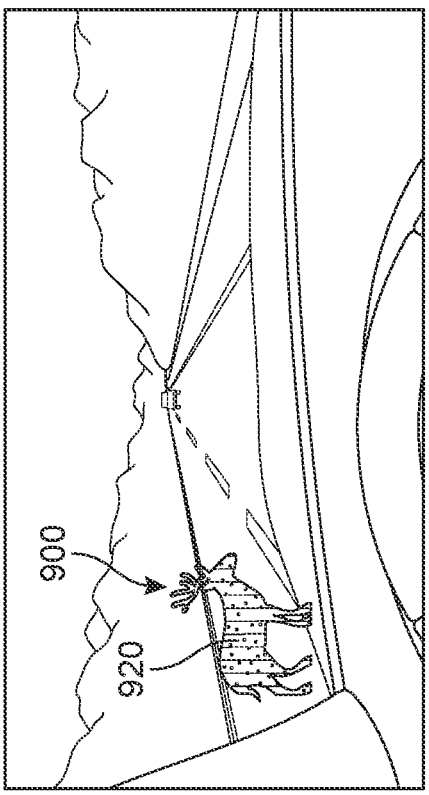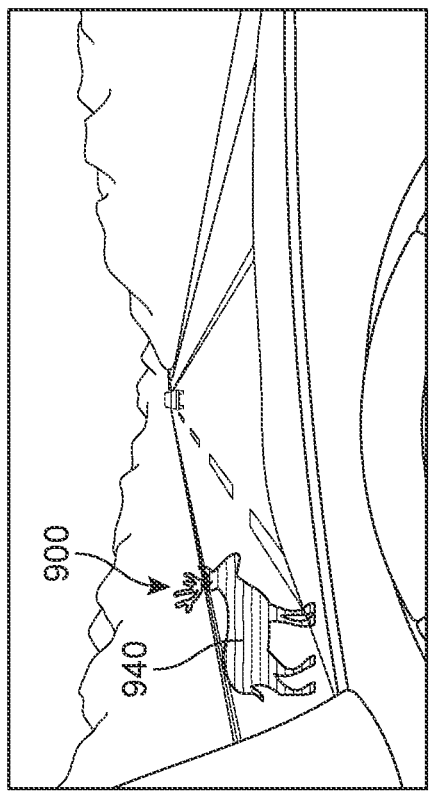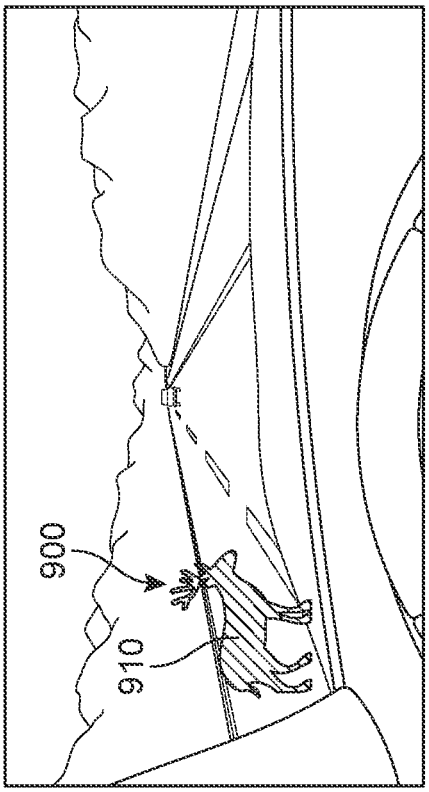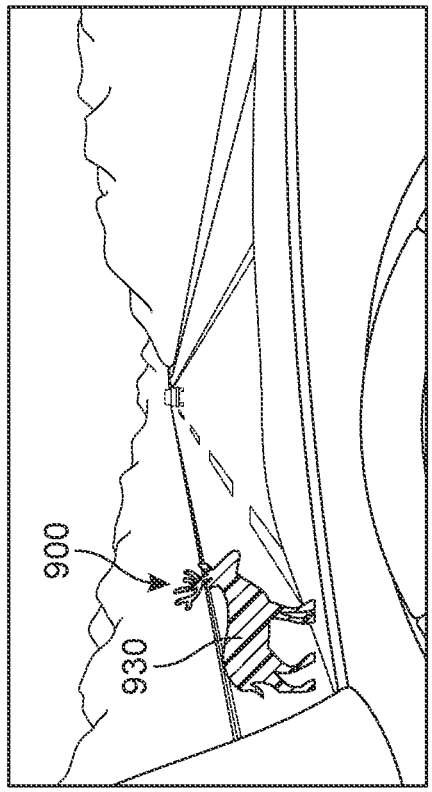

INTELLIGENT VEHICLE GUIDANCE FOR IMPROVED DRIVING SAFETY

CROSS-REFERENCE TO RELATED APPLICATIONS

This application is a continuation of Post et al., U.S. patent application Ser. No. 17/006,342, filed Aug. 28, 2020, now U.S. Pat. No. 11,180,159, and entitled "Intelligent Vehicle Guidance for Improved Driving Safety," which claims priority to U.S. Provisional Patent Application No. 62/894,068, filed Aug. 30, 2019. The entire disclosures of the applications listed above are hereby incorporated by reference.

TECHNICAL FIELD

The present disclosure generally relates to intelligent routing, and specifically to a method for routing vehicles to improve driving safety.

BACKGROUND

Defensive driving skills help drivers reduce the risk of collisions by anticipating dangerous situations that may occur while driving, even when the driver is operating the vehicle in a technically sound manner. One aspect of defensive driving may include ensuring that the driver has adequate warning of upcoming obstacles on the road. In particular, obstacles that are dynamic and changing position can present difficulties to a driver's ability to respond in a thoughtful manner. Such obstacles can be non-vehicular, such as animals, children, or other unexpected obstacles. Providing information about these external road conditions to a driver can significantly reduce the likelihood of accidents and damage to persons and property. Currently, vehicle alert systems offer basic information about conditions directly associated with the vehicle's current location. Conventional alerts fail to convey warnings about dynamic obstacles that may be present at a location still ahead of the driver as they travel along a particular route.

There is a need in the art for a system and method that addresses the shortcomings discussed above.

SUMMARY

In one aspect, a method of providing alerts to a driver of a first vehicle includes receiving, from a second vehicle and at a first time, first information about an obstacle associated with an environment outside of the second vehicle around the first time, as well as determining, based on the first information, a first predicted path of the obstacle. The method further includes receiving a first current location and a first current route of the first vehicle, and determining, based at least on the first current location and first current route of the first vehicle and the first predicted path of the obstacle, that there is a first likelihood of a vehicle obstacle intersection event occurring between the first vehicle and the obstacle at a first location. The method also includes causing, in response to the determination of the first likelihood of a vehicle obstacle intersection event occurring, a first alert to be presented to the driver of the first vehicle.

In another aspect, a method of providing a driving route for a vehicle includes receiving, from a second vehicle and at a first time, first information about an obstacle associated with an environment outside of the second vehicle around the first time, and then determining, based on the first information, a first predicted path of the obstacle. The method also includes receiving a first current location and a first current route of the first vehicle, and determining, based at least on the first current location and first current route of the first vehicle and the first predicted path of the obstacle, that there is a first likelihood of a vehicle obstacle intersection event occurring between the first vehicle and the obstacle at a first location at a second time subsequent to the first time. In addition, the method includes causing to be generated, in response to the determination of the first likelihood of a vehicle obstacle intersection event occurring, a first alternate route for the first vehicle that avoids the first location around the second time, and providing an indicator to the driver that the first alternate route is available and may be accessed by the driver.

In another aspect, a system for alerting a driver of a vehicle includes a processor and machine-readable media including instructions which, when executed by the processor, cause the processor to receive, from a second vehicle and at a first time, first information about an obstacle associated with an environment outside of the second vehicle around the first time, and then to determine, based on the first information, a first predicted path of the obstacle. The instructions further cause the processor to receive a first current location and a first current route of the first vehicle, and determine, based at least on the first current location and first current route of the first vehicle and the first predicted path of the obstacle, that there is a first likelihood of a vehicle obstacle intersection event occurring between the first vehicle and the obstacle. In addition, the instructions cause the processor to cause, in response to the determination of the first likelihood of a vehicle obstacle intersection event occurring, a first alert to be presented to the driver of the first vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 9A-9D are examples of an alert that changes appearance in response to changes in proximity to a predicted intersection event, according to an embodiment;

DETAILED DESCRIPTION

The embodiments provide a method and system to improve driving safety. Specifically, the method and system enable intelligent alerts to be presented to a driver of a vehicle based on not only information about the vehicle's current location, but also information about external road conditions that are expected to affect the vehicle as it continues forward on its journey. For example, vehicles may have onboard sensors such as LIDAR that can detect objects. An image recognition system can be configured to use sensed information to identify objects at a distance that are traveling towards one or more roadways, such as deer or children. The vehicle can receive information collected by other vehicles on the roadways in real-time, as well as share its own data with other vehicles and/or a cloud-based alerting service. Moreover, the vehicle or systems associated with the vehicle can use the data to identify obstacle types and estimate a trajectory for dynamic obstacles such as animals and pedestrians, and a time when the objects are likely to pass over one or more roadways. The system can determine if this trajectory is likely to intersect with or come into close proximity to the vehicle during the upcoming drive and present alerts, including augmented reality (AR) projections, at appropriate times to the driver as the vehicle approaches these projected intersection locations. The system can also generate a new route to the driver's destination that reduces the likelihood of an intersection between the vehicle and the potential obstacle. If the travel of the object deviates from the projected travel based on newly sensed information, the alerts can be updated accordingly.

By selecting routes that avoid, or limit, exposing a driver to challenging external conditions, the system and method promote increased driving safety. This helps reduce or eliminate stresses that can lead a driver to make rash or unsafe decisions. The present system and methods may therefore be seen as facilitating defensive driving.

Figure 1:
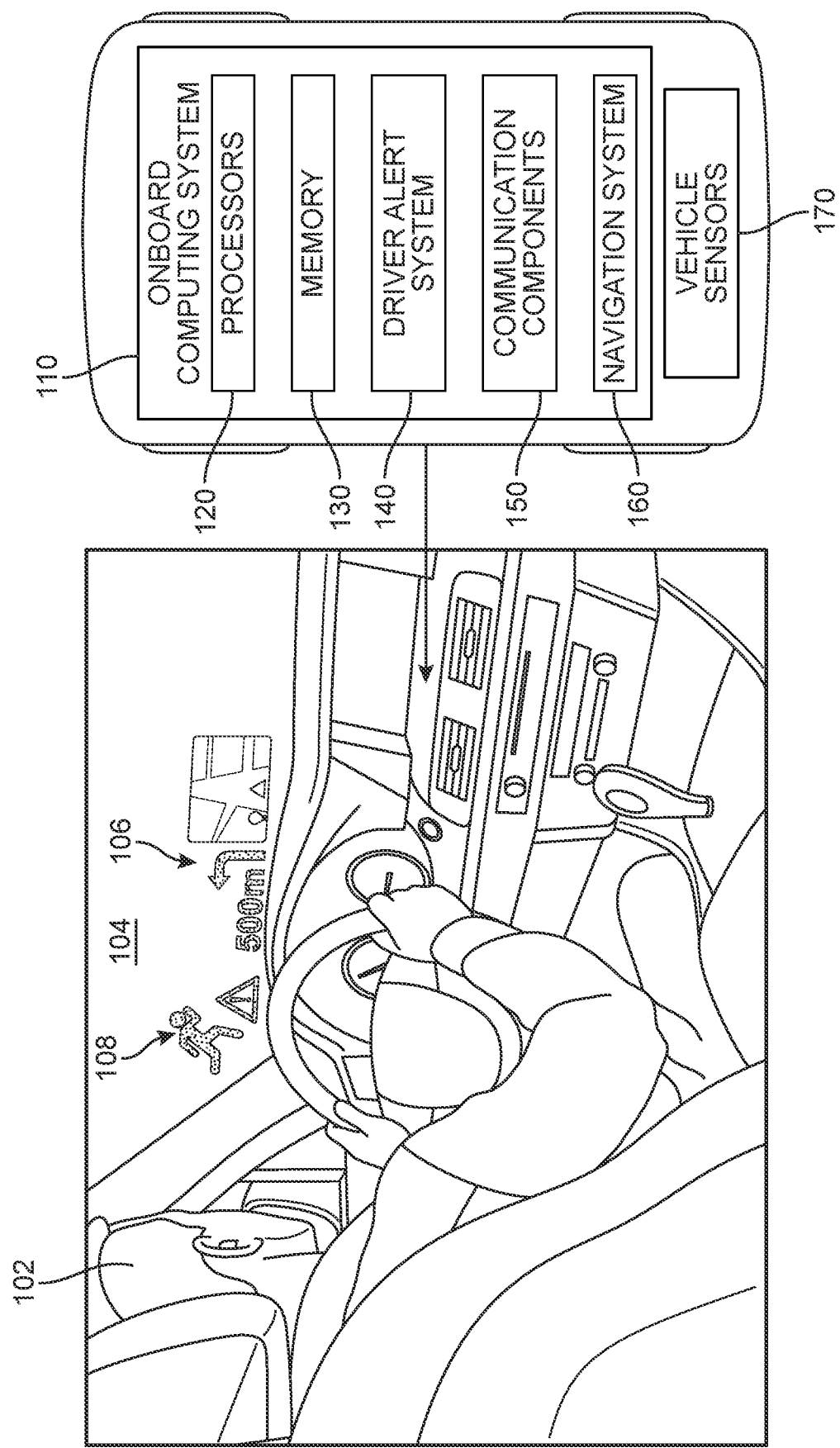
FIG. 1 is an example of an interior view of a motor vehicle alongside a schematic of a vehicle computing system, according to an embodiment.

Referring now to FIG. 1, a view of an interior of one embodiment of a motor vehicle ("vehicle") 100 is illustrated. The vehicle 100 may include an onboard computing system 110. Onboard computing system 110 may comprise a single computing device, or a network of multiple computing devices. Onboard computing system 110 could be associated with one or more electronic control units (ECUs).

As seen in FIG. 1, onboard computing system 110 includes one or more processors 120 and memory 130. Memory 130 may comprise a non-transitory computer readable medium. Instructions stored within memory 130 may be executed by the one or more processors 120.

For clarity, some of the vehicle systems of the embodiments are depicted as residing within a single onboard computing system 110. However, it may be appreciated that in some embodiments, one or more of these systems could be separate and may not comprise part of a single computing system. Instead, two or more systems could each comprise their own processors and/or memory, as well as components facilitating communication with other systems.

Vehicle 100 may also include one or more communication components 150. Communication components 150 may include cellular network components for communicating over cellular networks, Wi-Fi components for communicating over Wi-Fi networks, and other communication components.

Vehicle 100 may also include a navigation system 160. In some cases, navigation system 160 includes a GPS receiver that can receive GPS information. In other cases, navigation system 160 can include other receivers capable of receiving global or local positioning information. Additionally, navigation system 160 may comprise maps and/or information from other kinds of geographic information systems (GIS) that can be used to generate navigation routes for a driver.

Figure 5:
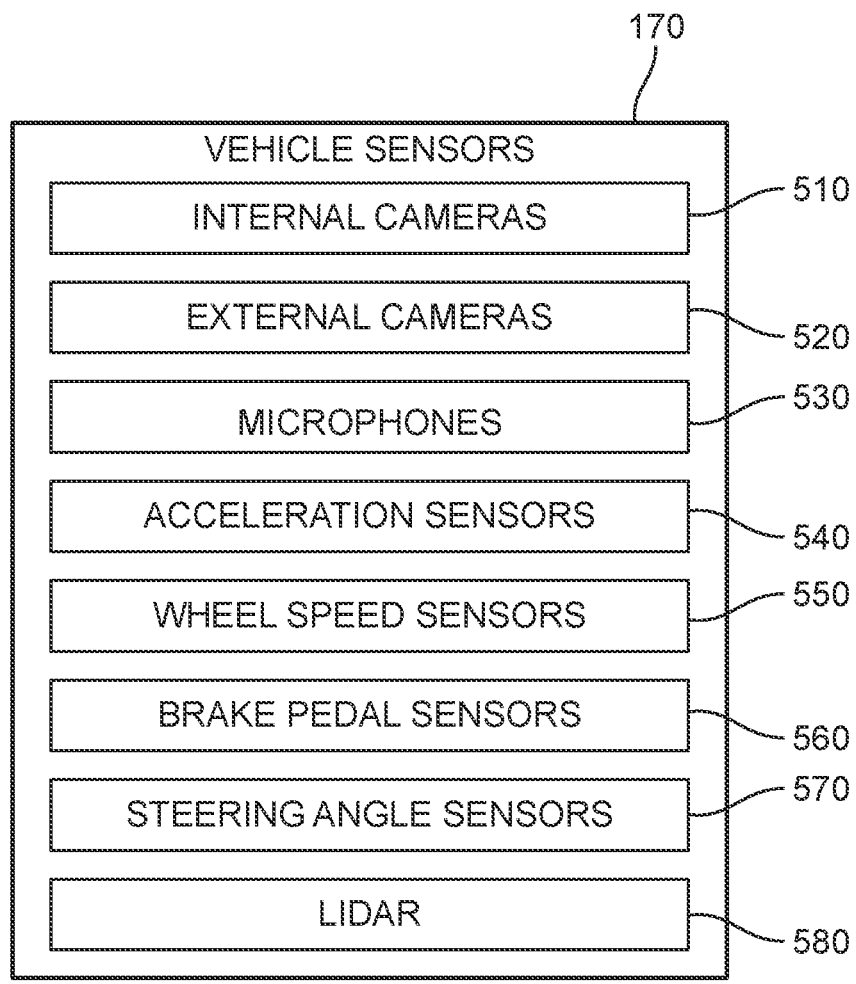
FIG. 5 is a schematic view of a set of vehicle sensors, according to an embodiment.
Figure 6A:
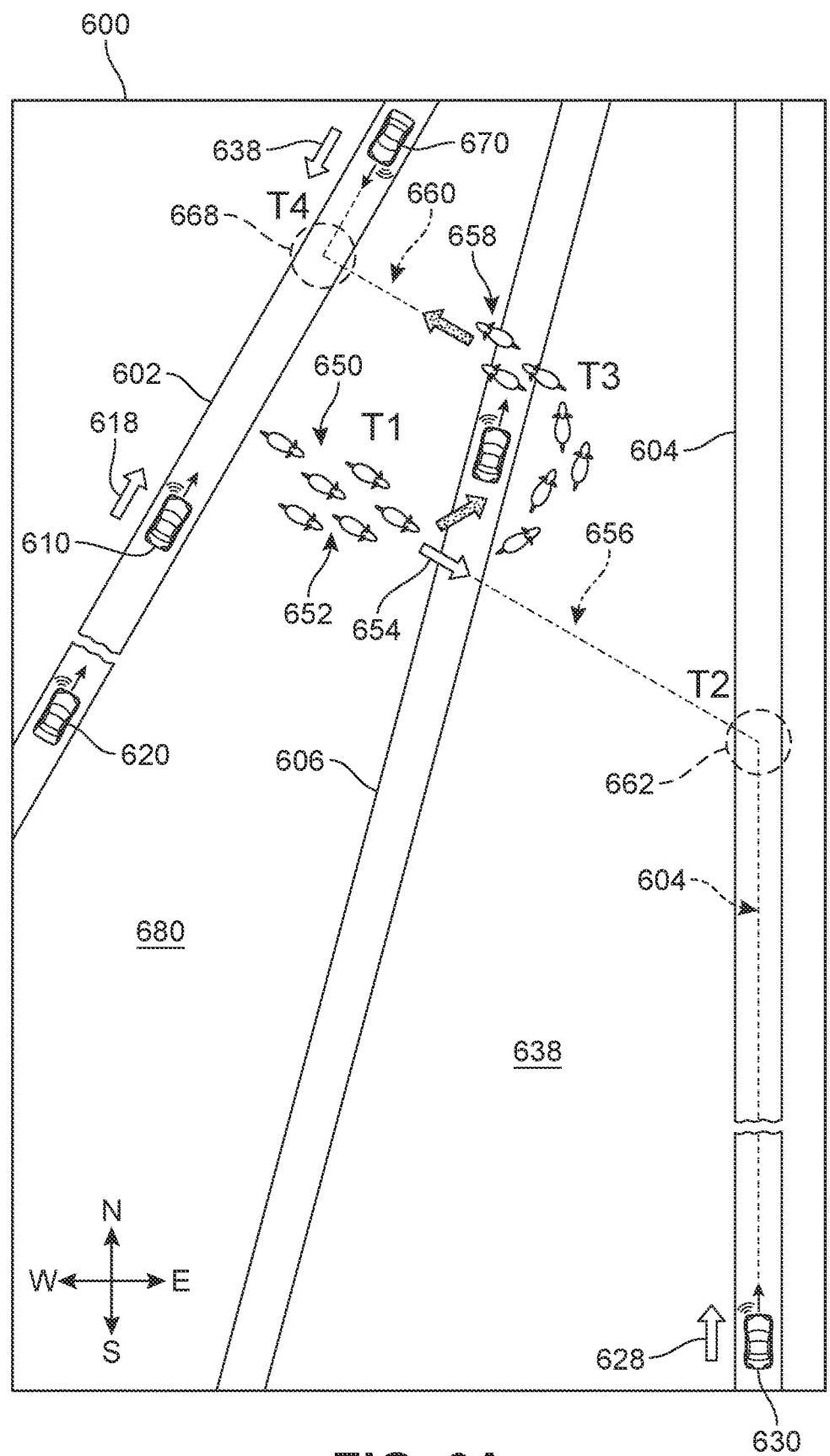
FIGS. 6A-6D collectively present a scenario where a first vehicle collect data about an obstacle that is shared with a second, different vehicle, and where such data is updated, according to an embodiment.
Figure 6B:
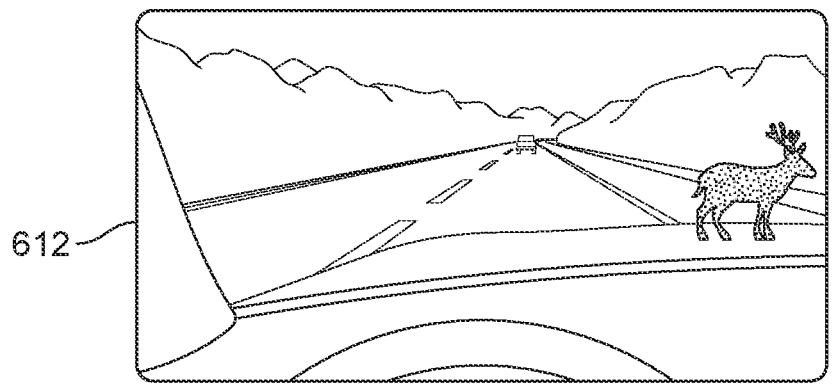
Figure 6C:
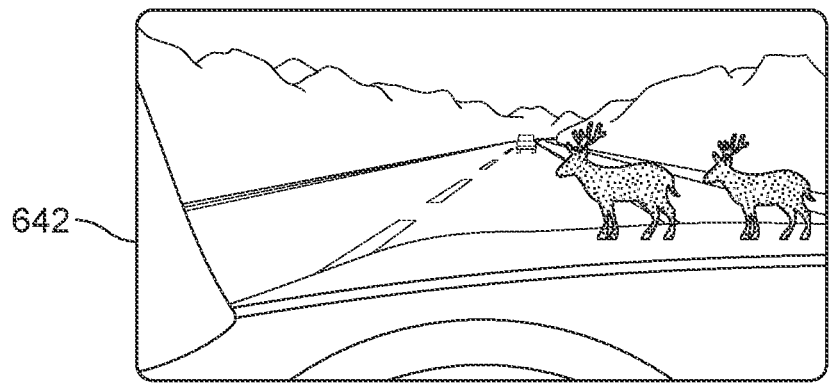
Figure 6D:
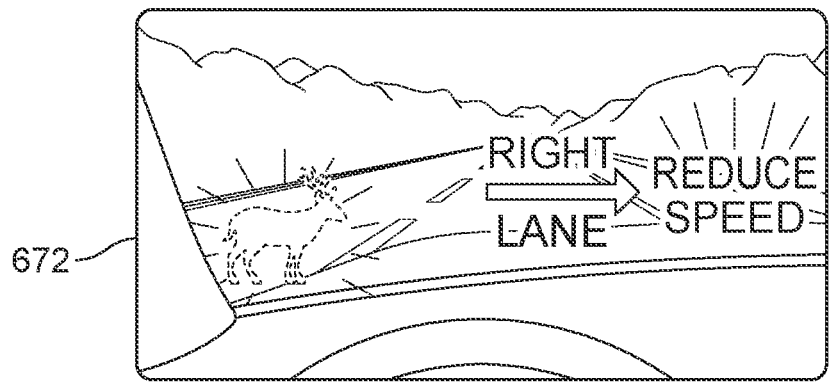

Vehicle 100 may also include one or more vehicle sensors 170 (see FIG. 5). Vehicle 100 may also include an onboard diagnostics (OBD) system, which is not shown for clarity. An OBD system may track and process various vehicle sensor information. In some cases, one or more systems of vehicle 100 could retrieve sensory data from the OBD system rather than directly from the sensors themselves.

In different embodiments, the onboard computing system 110 of vehicle 100 may be configured to communicate with one or more remote systems over a network (not shown in FIG. 1). The network could comprise any wide area network, local area network or other suitable network. In some cases, network may be the Internet. The onboard computing system 110 may communicate, for example, with one or more external database systems. An external database system can include a server (including processors and memory) and a database, and the external database system may store various kinds of information, including, but not limited to: navigation information, geospatial information, road conditions (for example, real-time traffic patterns), weather information (including, for example, rain, snow, ice and/or flooding forecasts), as well as other kinds of information. It may be appreciated that onboard computing system 110 may both send and receive information to and from these remote databases. Moreover, it may also be appreciated that in other embodiments, one or more of these databases (or parts of the databases) could be locally disposed within vehicle 100.

As seen in FIG. 1, the vehicle 100 further includes a driver alert system 140. Driver alert system 140 may be configured to transmit and/or receive external road conditions around the vehicle 100 or other motor vehicles traveling on the roadways, as described in further detail below and shown schematically in FIG. 3.

For purposes of illustration, the interior of the vehicle 100 in FIG. 1 includes a driver 102 seated in the driver's seat and, in the driver's field of view, a head-up display ("display") 104 presenting various visual indicators. A head-up display refers to a system in which information is projected upon a visor, a screen between the operator and a windscreen, or directly upon the windscreen. A common type of head-up display—which is illustrated in the drawings—includes a windscreen equipped with features capable of displaying an image projected thereupon while remaining transparent or substantially transparent such that occupants of the vehicle can clearly observe outside of the vehicle through the windscreen. It may be appreciated that while the display includes the windscreen in the front of the vehicle, other surfaces within the vehicle could be used for projection, including side windows and/or a rear window. Additionally, the view on the front windscreen could be continued upon the front vehicle "A-pillars" and onto the side windows as a continuous image if desired and the vehicle is so configured. In some embodiments, an augmented reality (AR) display is spatially overlaid on a head up display for a driver of the vehicle. Thus, visual indicators (alerts) described herein may make use of any type of head-up display and AR display that is available in the vehicle for presentation of alerts or notifications via the onboard computing system 110.

For example, an optional navigation guidance indicator 106 for providing step-by-step routing instructions to the driver 102 can be displayed on the head-up display. Furthermore, the display 104 of FIG. 1 is shown presenting an alert 108 to the driver 102, here comprising an AR projection. As will be discussed further below, in some embodiments, the alert 108 can be configured as a visual icon identifying the category type of the detected obstacle. In this case, the alert 108 is an icon of a child running, informing the driver 102 that the obstacle he/she is being warned about is a child. In some embodiments, the alert 108 can offer additional details about the obstacle. It can be understood that in one embodiment, the obstacle for which the alert 108 is being presented is not currently in the operational range of the vehicle sensors 170. In other words, the alert 108 has been triggered or activated in response to information obtained by sensors other than vehicle sensors 170 regarding road conditions beyond or outside the range of the vehicle sensors 170 at the current location of the vehicle 100.

Figure 2:
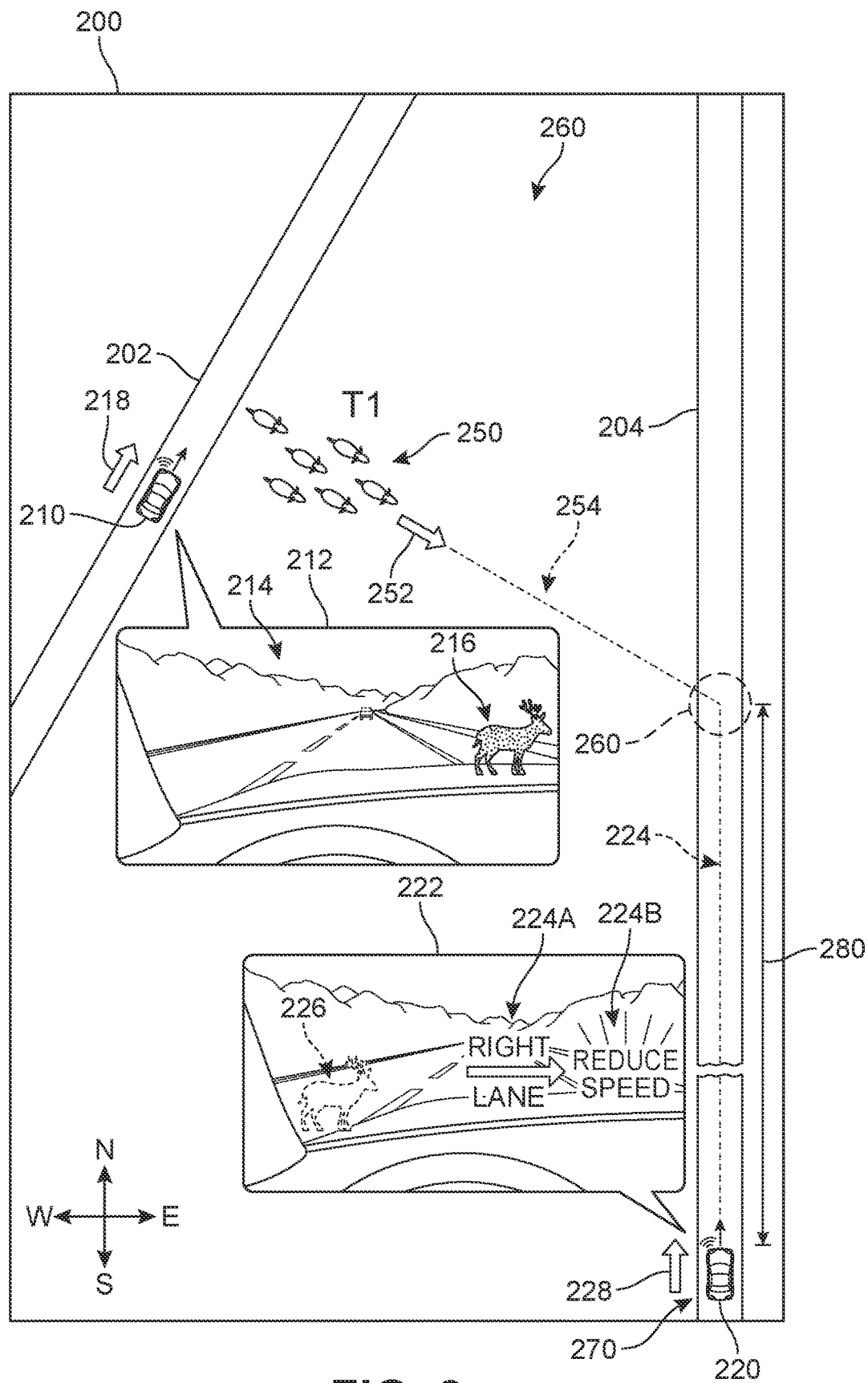
FIG. 2 is a schematic view of a scenario where a first vehicle may collect data about an obstacle that is shared with a second, different vehicle, according to an embodiment.

In different embodiments, the systems described herein can include provisions for sharing data between multiple vehicles configured with vehicle sensors and communication modules ("data mapping vehicles"). The systems can further include provisions for identifying obstacles around one or more of the vehicles that may potentially affect traffic conditions for the data mapping vehicles and possibly other vehicles. FIG. 2 is a bird's-eye or top-down view of a first set of roadways 200 including a first road 202 and a second road 204. A first vehicle 210 is traveling along the first road 202 in a first direction 218 and a second vehicle 220 is traveling along the second road 204 in a second direction 228 that is roughly similar to or generally aligned with the first direction 218 (in this case, a northeastern direction). The first vehicle 210 is shown as 'ahead' or located further north than the second vehicle 220. As the first vehicle 210 traveled (and currently travels) up the first road 202, sensors for first vehicle 210 detect at a first (current) time T1 a plurality of dynamic objects (here a herd of deer) in front of the first vehicle 210 and in the process of crossing the first road 202 from left to right in a generally southeastern direction 252. This is further reflected by a depiction of a first field of view 212 of an AR-enabled display 214 in the first vehicle 210, where a visualization 216 of the remaining deer on the right side of the road is still visible to the driver of the first vehicle 210.

In some embodiments, a driver alert processing system associated with or in communication with the first vehicle 210 receives the information collected by the first vehicle 210. In one embodiment, the system is also configured to classify the plurality of dynamic objects based on access to various classification paradigm(s) for easy reference by a driver. In this example, the objects have been classified as a herd of deer ("deer") 250. In addition, in some embodiments, the system is configured to predict the most likely path of travel (a predicted path 254) of the target object(s) for at least a first period of time. The predicted path 254 of the target objects is based on the most up to date sensor data collected about the target object(s), including for example, a speed of the object, an acceleration of the object, a heading of the object, and/or other aspects. This predicted path 254 can further be used by the system to determine a window of time when the objects are likely to pass over one or more roadways.

For purposes of this example, the predicted path 254 of the deer 250 extends through an intermediate region 260 that does not include any roadways until reaching the second road 204 at a projected intersection zone ("intersection zone") 260. Though not shown here, the predicted path 254 may continue onward from there. Thus, based on the path predicted by the system of the deer 250, the second road 204 will include an obstacle at a second (future) time T2. This information can be conveyed to other vehicles, including the second vehicle 220 traveling on the second road 204. In other words, while the second vehicle 220 is currently (at time T1) at a first location 270 on the second road 204, it is estimated that the second vehicle 220 will be at a second location corresponding to and/or overlapping with the intersection zone 260 at the second (future) time T2, such that a vehicle obstacle intersection event is predicted to occur at time T2. In response to this receiving this information, a driver alert system associated with the second vehicle 220 can be configured to cause a presentation of one or more alerts to the driver of the second vehicle 220. An example of this is reflected by a depiction of a second field of view 222 of an AR-enabled display 228 in the second vehicle 220, where a first alert 226 is being presented. In some embodiments, the alert can be a visual, tactile, haptic, and/or audio-based indicator that is presented to warn the driver about a particular obstacle for which an upcoming vehicle obstacle intersection event ("intersection event") has been predicted. It should be understood that although the term "intersection event" is used here and throughout this description, the vehicle need only be predicted to drive within a particular range or proximity (for example, within 500 feet or less) of the expected position of the obstacle at the upcoming time to trigger the alert.

The first alert 226 in this case is a visual-based indicator, being shown or displayed toward a left-hand side of the display 228, in accordance with the direction from which the deer 250 are expected to approach. In one embodiment, the first alert 226 is an AR-based image. In addition, because the second vehicle 220 is currently (at first time T1) at a remaining distance 280 from the intersection zone 260, the first alert 226 is dimmed (represented by dotted lines in FIG. 2). Furthermore, because the obstacle was classified as deer, the first alert 226 is in the shape of a deer. Additional aspects of the alert may be adjusted according to, for example, the distance remaining (i.e., proximity), the time until the intersection event is expected to occur, the classification type assigned to the obstacle, the changing speed of the vehicle, and/or updates to the predicted path of the obstacle. Furthermore, in some embodiments, the display 228 can present additional information and/or guidance. For example, in FIG. 2, a second alert 224 is also shown, comprising first guidance indicator ("Right Lane") 224a suggesting that the driver move to a right lane, and a second guidance indicator ("Reduce Speed") 224b suggesting that the driver decrease the speed at which the second vehicle 220 is traveling. In some other embodiments, the driver can also be provided with options to view alternate routes that would detour around or avoid the predicted path currently associated with the obstacle, as will be discussed further below.

Figure 3:
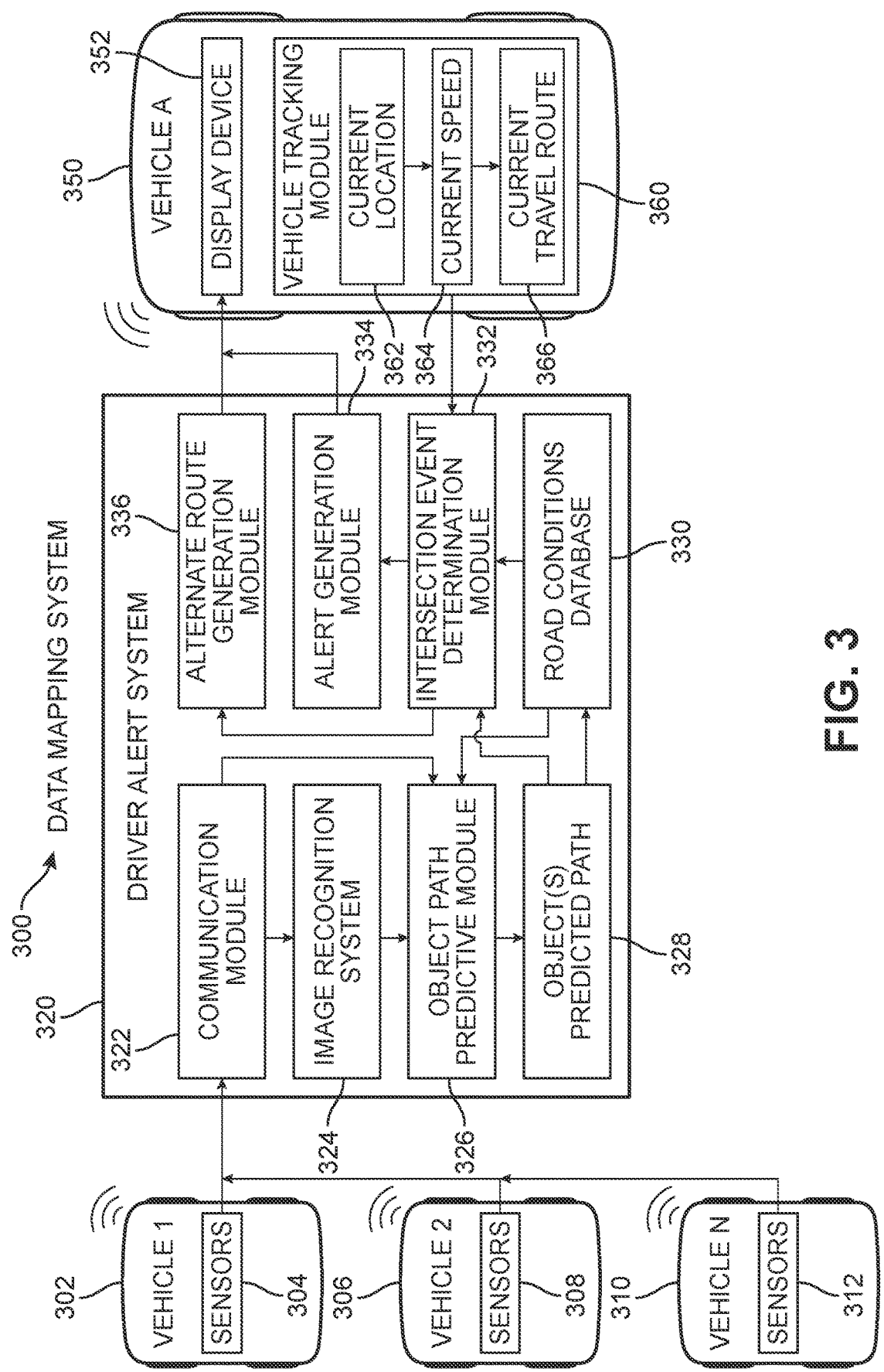
FIG. 3 is a schematic diagram of a driver alerts system being implemented as part of a shared data mapping system, according to an embodiment.

In order to provide greater understanding of some of the proposed embodiments to the reader, FIG. 3 depicts an overview of an embodiment of a vehicle data mapping system 300 in which vehicles can share data and receive alerts and/or alternate route guidance via access to components of a driver alert system ("system") 320. In FIG. 3, a plurality of sensor-equipped vehicles (in this example, a Vehicle 1 302, Vehicle 2 306, and Vehicle N 310) are transmitting, conveying, or otherwise providing to (and in some cases receiving data from) the system 320 or its components or modules thereof. These "data-generating vehicles" (Vehicle 1 302, Vehicle 2 306, and Vehicle N 310) are configured to detect via a plurality of sensors (see FIGS. 1 and 5) external road conditions such as physical objects around the vehicle. While such vehicles will generally be in transit and moving from one destination to another as the sensors collect data, in some embodiments, the vehicles may be parked or otherwise not actively traveling along the roadways when the data is collected.

In addition, a plurality of actively transiting vehicles (including for example a Vehicle A 350 and a Vehicle B 370) can receive signal(s) to generate alerts and/or alternate route guidance via the driver alert system 320 and/or components or modules thereof. As shown in FIG. 3, the system 320 includes a communication module 322 configured to receive data generated by the data-generating vehicles via vehicle sensors 304 of Vehicle 1 302, vehicle sensors 308 of Vehicle 2 306, and/or vehicle sensors 312 of Vehicle N 310. In some embodiments, the communication module 322 can also be configured to send data back to the data-generation vehicles or submit (ping) a request to a specific vehicle computing system for additional information. In different embodiments, an onboard computing system (see for example, onboard computing system 110 in FIG. 1) can facilitate or enable the transfer of data between the vehicle and system 320.

The data received by the system 320 can be evaluated by an image recognition system 324. The image recognition system 324 is configured to identify objects at a distance that are traveling towards one or more roadways (such as deer or children). For example, an object classification paradigm may be applied to a vehicle's data in which potentially dynamic (moving) objects are detected in order to best determine the type of object that was detected. Although not shown here, in some embodiments, the image recognition system 324 can access an obstacle determination module configured to assess the relevance of the detected object as an obstacle and determine whether the tracking data for the object ("object snapshot") should be used to produce a predicted path for this object. Furthermore, the obstacle determination module can be configured to group multiple objects of a similar type that were detected at or around the same time frame, and if appropriate, label or refer to the group as a single obstacle. This may occur in cases where a group of animals (such as a herd traveling together), or a group of children, or other groups of people, are moving together in the same direction. However, this type of grouping may be uncoupled or de-grouped if subsequent data indicates the objects are separating, dispersing, or have become separated and are now associated with different trajectories. Similarly, obstacles that were initially discrete or separate may be grouped together if subsequent data indicates the objects are now coalescing and traveling together along the same trajectory.

In a next step, the classified object information can be shared with an object path predictive module 326, which is configured to determine the most likely or probable path (predicted path 328) that the target object will be moving along for a future window of time or path distance, where the accuracy of the prediction generally decreases as the window size and/or path distance is increased. In some embodiments, even in cases where the object type is not recognized by the image recognition system 324, the object path predictive module 326 can determine a predicted path. In some embodiments, the object path predictive module 326 can use information collected by data-generating vehicles and shared with the object path predictive module 326 via communication module 322 to determine the most likely path or trajectory of the object. For example, information such as an average or most recent speed, acceleration, size, type, and/or last (most recent) direction of the object can be used by the object path predictive module 326 to determine the object predicted path 328.

In some embodiments, the window size or path length associated with the predicted path 328 can be based on the amount or robustness of the data received from data-generating vehicles (for example, robust or high-quality data and/or larger sets of data about an object can allow for the system to project a future path that extends farther out in time and/or distance). In another embodiment, there may be a minimum predicted path length or window of time for which the prediction extends that is pre-determined by the system 320 or configured/selected by drivers. In some embodiments, the predicted path length or window of time can be configured to extend to the minimum range until another roadway (other than the roadway that the object was previously "seen") is included in the path.

The resultant predicted path 328 can be received by a road conditions database 330 for temporary or permanent storage, for example for system improvements, for comparison with or updates to previously generated predicted paths for the same object, or as a reference for subsequently generated predicted paths for the same object (updates). Thus, as an example, if data about an object is received from Vehicle 1 302 at a first time, a first predicted path can be generated and stored in the road conditions database 330. If data about the same object is received from Vehicle 2 306 at a subsequent second time, the predicted path stored in the database for this object can be updated and/or replaced.

The predicted path 328 (or an updated version of the predicted path 328) will also be received by an intersection event determination module 332, which is configured to determine whether the predicted path 328 is likely to disrupt or otherwise be present on a roadway where other vehicles registered with the mapping system 300 are also expected or projected to travel. These vehicles can share their routing information with system 320. In some embodiments, a vehicle such as Vehicle A 350 can include a vehicle tracking module 360 that can provide information such as a current location 362, a current speed 364, and a current travel route 366 of the vehicle to the system 320. The intersection event determination module 332 can evaluate the two paths and track the expected position of the vehicle relative to the expected position of the potential obstacle for a period of time. If at any point the two are likely to overlap or are expected to be proximate (for example, within 500 feet or less) to one another as the vehicle continues on its journey, a potential intersection event may be identified. The identification of an intersection event between the obstacle and a vehicle can trigger an alert generation module 334, which can cause an alert to be presented to the driver via a display device 352 of the vehicle. In some embodiments, the identification of an intersection event can also or alternatively trigger an alternate route generation module 336, which can present guidance to reroute the driver along an alternate route that is likely avoid the target obstacle.

Although not shown here, it should be understood that in some embodiments, transiting vehicles such as Vehicle A 350 can also include sensors and provide data about external road conditions to the system 320 for the benefit of other vehicles on nearby roadways. Similarly, one or more of the data-generating vehicles can also be recipients of the data provided by other data-generating vehicles.

Furthermore, while the driver alert system 320 in FIG. 3 is shown outside of or external relative to the vehicles, it should be understood that in different embodiments, the system 320 and/or components thereof can be located in each of the vehicles themselves, and the vehicles may communicate directly via a vehicle-to-vehicle network, for example via a cellular network (represented by concentric 'wireless' symbols in the drawings). In another embodiment, the system 320 and/or components thereof can be accessed through a cloud network and stored on a cloud-based server. In another example, the components such as communication module 322, image recognition system 324, object path predictive module 326, and/or object predicted path 328 can be associated with Vehicle 1 302, while road conditions database 330 is associated with a cloud computing service, and intersection event determination module 332, alert generation module 334, and/or alternate route generation module 336 are associated with Vehicle A 350. In some other embodiments, all aspects and components of system 320 may be associated with Vehicle A 350 and/or data-generating vehicles, such that alerts are triggered locally within the vehicle and/or alternate routes are generated in concert with the vehicle's own internal navigation system.

Figure 4:
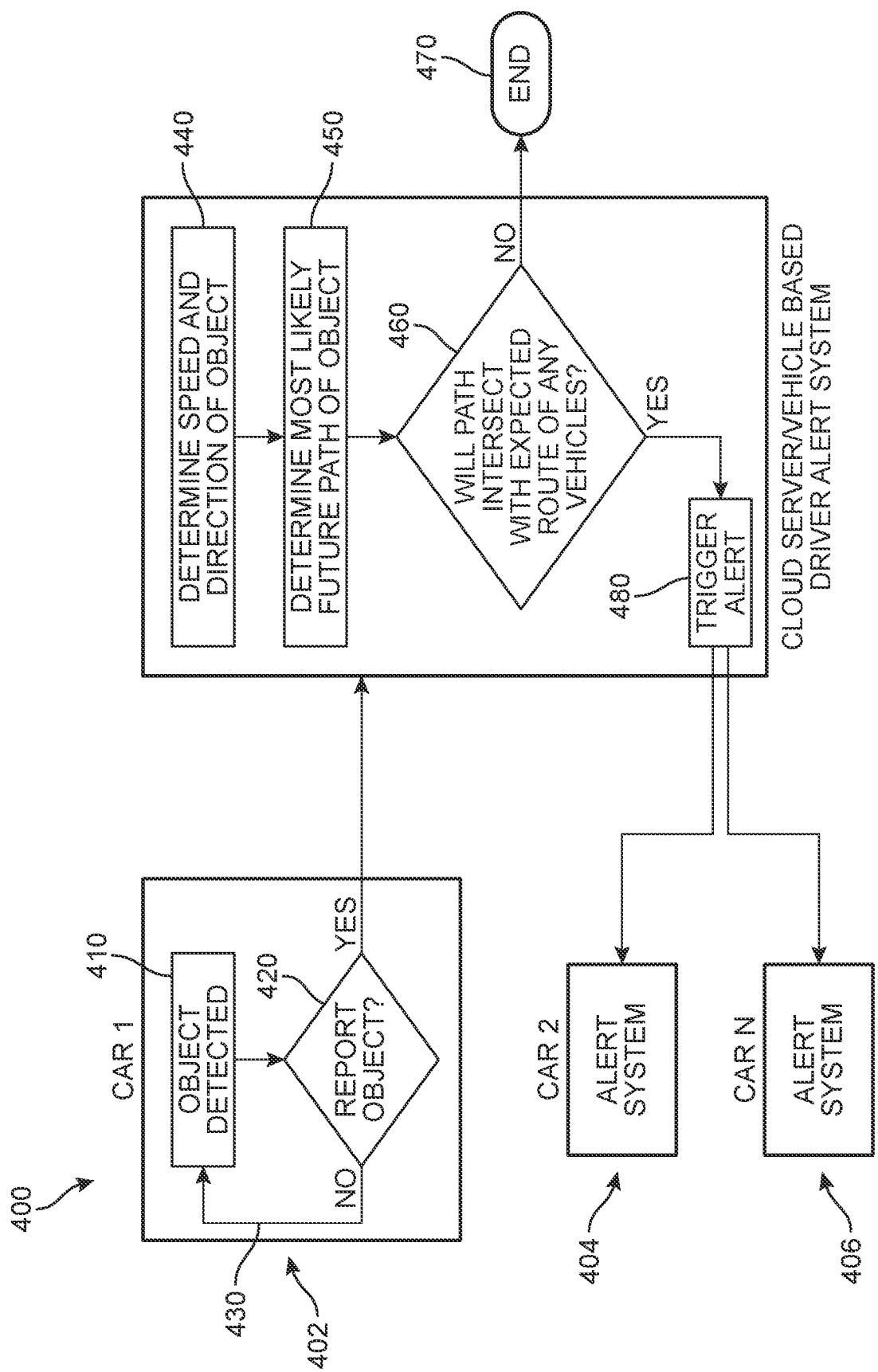
FIG. 4 is a flow diagram of a process of alerting a driver of a vehicle using information obtained by other drivers, according to an embodiment.

For purposes of clarity, FIG. 4 presents a schematic view of a process 400 for sensing external conditions and detecting objects on a roadway from a first vehicle 402, and sharing that information for use by a different vehicle to facilitate defensive driving, such as a second vehicle 404 and a third vehicle 406. It may be appreciated that one or more of these steps may be performed by an onboard computing system, such as onboard computing system 110 (see FIG. 1), and can incorporate features and modules described with reference to FIG. 3.

In a first step 410, the computing system of first vehicle 402 may receive information about external conditions around the first vehicle 402. For example, external conditions may include, but are not limited to: road conditions, weather conditions, time of day, and (non-vehicular) dynamic objects moving on or near the roadway. Road conditions may include information about the condition of the current road and/or adjacent roadways. These may include current traffic patterns, physical road conditions (e.g., potholes), the type of roadway (for example, a neighborhood street, a highway, etc.), the presence of a stop sign, the presence of a stoplight, the presence of a one-way sign, the presence of traffic cones or other barriers, the number of lanes, as well as possibly other roadway condition information. Weather conditions could include, for instance, whether it is dry, raining, windy, snowing, and/or if the roads are wet, dry or icy. Time of day can include an explicit time (for example, 3 μm), or a general timeframe such as morning, afternoon, evening and/or late-night. Time of day may also explicitly or implicitly include information about lighting conditions. For example, if the time of day is 9 μm, the system can infer that it is dark outside. In other embodiments, a system could monitor ambient lighting conditions directly using one or more ambient lighting sensors.

Returning to the process of FIG. 4, in first step 410, the computing system of the first vehicle 402 may detect a dynamic object, such as an animal or pedestrian. In a second step 420, the first vehicle 402 may determine whether the object should be submitted for further processing and reporting to the driver alert system, which may be accessible via a cloud or other network connection, or may be available in the vehicle itself. In some embodiments, the object may be classified and/or identified prior to determining if the object should be further processed or reported, and/or the presence of multiple similar objects can be grouped into a single obstacle type following the substantially same trajectory during this stage.

If the object is deemed to be minor or of a type of little to no relevance to road conditions, the process can return to the initial state in a third step 430. If the object is deemed to comprise an obstacle that may impact or otherwise affect expected upcoming road conditions ("Yes") the information is shared with the driver alert system, in a fourth step 440 the system can determine the speed and direction of the object. In a fifth step 450 the system determines the most likely future path of the object. This is followed by a sixth step 460 whereby the system checks if the future path will intersect with the expected route of vehicles that are currently driving along nearby roadways. If no intersection event is projected, the process can end in a seventh step 470. However, if an intersection event is projected for a vehicle registered with the system, the system can cause an alert to be generated in the corresponding vehicle in an eighth step 480. For example, a second vehicle 404 may be traveling on a first roadway where the obstacle is expected to intersect the path of the second vehicle at a first time, and a third vehicle 406 may be traveling on a second different roadway (or a different portion of the same first roadway) where the obstacle is expected to intersect the path of the third vehicle at a second time subsequent to the first time. Each of the second vehicle and the third vehicle can present alerts to their respective drivers. However, each alert may differ, may be presented at different times, and/or may be accompanied by different information about the obstacle, including different estimated times of intersection.

This process allows the system to identify, for a later time, when a given route passes through or near a roadway where there are dynamic obstacles or other external conditions that might cause the driver difficulty or be unsafe. As described in further detail below, this information can be used by the system to cause alert(s) to be presented to the driver and/or to route the driver around the external conditions associated with increased difficulty.

The data gathered during the process shown in FIG. 4, including external conditions and location information associated with unsafe driving conditions could be fed into a machine learning algorithm. The machine learning algorithm could be used to facilitate learning patterns in external conditions that cause the driver to deviate from the route planned prior to the issuance of the warning alert. Examples of machine learning algorithms that could be used include, but are not limited to: supervised learning algorithms, unsupervised learning algorithms, and reinforcement learning algorithms.

As noted above, vehicles participating in the data mapping system can collect or generate data. In some embodiments, this data can encompass information about the performance of the vehicle itself, referred to as vehicle feedback information. Examples of vehicle feedback information include, but are not limited to: vehicle lane position, relative vehicle speed, adjacent vehicle proximity, and braking response. In some embodiments, this can be used along with the data regarding external road conditions to determine the predicted path of an obstacle. Various information can be received from one or more sensors including various sensors, as depicted in FIG. 5. These include, but are not limited to, internal cameras 510, external cameras 520, microphones 530, acceleration sensors 540 (for example, an acceleration pedal sensor), wheel speed sensors 550, brake pedal sensors 560, and steering angle sensors 570. Additionally, external road conditions (for example, adjacent vehicle proximity, dynamic objects) could be determined from a light detection and ranging system 580 (LIDAR) and/or RADAR based sensors.

As discussed above, in different embodiments, the systems described herein can include provisions to relay and evaluate updated information about a particular obstacle. In some embodiments, such updated information can be used to modify or cancel previously presented alerts or guidance. FIG. 6 depicts one example of an obstacle update scenario with a bird's-view of a second set of roadways 600 (similar to FIG. 2), including a first road 602, a second road 604, and a third road 606. A first vehicle 610 is traveling along the first road 202 in a first direction 618 and a second vehicle 620 is traveling along the same road in the same, first direction 618 (further ahead of the first vehicle 610). Similarly, a third vehicle 630 is traveling along the second road 604 in a second direction 628 that is roughly aligned with the first direction 218 (in this case, a northeastern direction). The first vehicle 610 and the second vehicle 620 are shown as 'ahead' or located further north than the third vehicle 630. As the first vehicle 610 traveled (and currently travels) up the first road 602, sensors for the first vehicle 610 detect at an initial first time T1 an obstacle comprising a plurality of dynamic objects (here a herd of deer) in front of the first vehicle 610 around a first position 652, the obstacle being in the process of crossing the first road 602 from left to right in a generally southeastern direction 654. This is further reflected by a depiction of a first field of view 612 of an AR-enabled display in the first vehicle 610, where a visualization of the remaining deer on the right side of the road is still visible to the driver of the first vehicle 610 (much as described with respect to FIG. 2).

In some embodiments, a driver alert processing system associated with or in communication with the first vehicle 610 receives the information collected by the first vehicle 610 and predicts the most likely path of travel (an initial predicted path 656) of the target object(s) for at least a first period of time extending between first time T1 and a future, second time T2. The initial predicted path 656 of the obstacle is based on the most up to date sensor data collected about the target object(s) at or around first time T1, including for example, a speed of the object, an acceleration of the object, a heading of the object, and/or other aspects. This initial predicted path 656 can further be used by the system to determine a window of time when the objects are likely to pass over one or more roadways.

In contrast to FIG. 2, for purposes of this example, the initial predicted path 656 of the deer 650 extends through an intermediate region 680 that includes the third road 606, and then continues until reaching the second road 604 at a first intersection zone 662. In some embodiments, prior to the deer 650 reaching the third road 606, the system can cause an alert to be presented to the third vehicle 630, as discussed above with respect to FIG. 2. Thus, based on the initial path predicted by the system of the deer 250, the second road 204 will include an obstacle at a second (future) time T2 after the first time T1. However, when the deer 650 arrive at the third road 606, sensors for a fourth vehicle 640 traveling on the third road 606 along first direction 618 detects their new position 658 at around a third time T3 that is after first time T1 and before the second time T2. This is further reflected by a depiction of a second field of view 642 of a display in the fourth vehicle 640, where a visualization of the deer crossing the road in front of the vehicle is visible to the driver of the fourth vehicle 640.

As new data is collected about the deer 650, including a new orientation or heading (a northwestern direction 664) that is approximately opposite to their previous heading (southeastern direction 654) by fourth vehicle 640, and the objects are identified as being the same obstacle previously detected and mapped, an updated set of data can be conveyed to other vehicles, including to a fifth vehicle 670 traveling on the first road 604 in third direction 638 (opposite to the first direction 618, generally toward the first vehicle 610 and second vehicle 620).

In some embodiments, a driver alert processing system associated with or in communication with the fifth vehicle 670 receives the information collected by the fourth vehicle 640 and predicts the most likely path of travel (a modified predicted path 660) of the target object(s) for at least a second period of time extending between third time T3 and a subsequent, fourth time T4. The modified predicted path 660 of the obstacle is based on the most up to date sensor data collected about the target object(s) at or around third time T3, including for example, a speed of the object, an acceleration of the object, a heading of the object, and/or other aspects. This modified predicted path 660 can further be used by the system to determine a window of time when the objects are likely to pass over one or more roadways.

In other words, while the fifth vehicle 670 is 'currently' (at third time T3) at a first location on the first road 602, it is estimated that the fifth vehicle 670 will be at a second location corresponding to and/or overlapping with a second intersection zone 668 at the fourth (future) time T4, such that a vehicle obstacle intersection event is predicted to occur at time T4. In response to this receiving this information, a driver alert system associated with the fifth vehicle 670 can be configured to cause a presentation of one or more alerts to the driver of the fifth vehicle 670. An example of this is reflected by a depiction of a third field of view 672 of an AR-enabled display in the fifth vehicle 670, where a first alert is being presented. The first alert in this case is a visual-based indicator, being shown or displayed toward a left-hand side of the display, in accordance with the direction from which the deer 250 are expected to approach. In one embodiment, the first alert 226 is an AR-based image. In addition, because the fifth vehicle 670 is currently (at third time T3) at a shorter remaining distance from the second intersection zone 668, the first alert is brightened (represented by radiating lines around the first alert in FIG. 6). Furthermore, because the obstacle was classified as deer, the first alert is in the shape of a deer. Additional aspects of the alert may be adjusted according to, for example, the distance remaining (i.e., proximity), the time until the intersection event is expected to occur, the classification assigned to the obstacle, the changing speed of the vehicle, and/or updates to the predicted path of the obstacle. Furthermore, in some embodiments, the display can present additional information and/or guidance, as noted in FIG. 2. In some other embodiments, the driver can also be provided with options to view alternate routes that would detour around or avoid the predicted path currently associated with the obstacle.

Meanwhile, because the more up-to-date updated predicted path 660 no longer has a likelihood of intersecting with the expected route of the third vehicle 630, the alert that was previously issued for third vehicle 630 is disabled or deactivated. Thus, the third vehicle 630 will no longer be warned about this particular obstacle (unless, for example, future data shows the obstacle moving back toward the second road 604). In addition, it can be observed that the first vehicle 610 and the second vehicle 620 may be heading toward the second intersection zone 668. However, by the time either of the first vehicle 610 or the second vehicle 620 arrives at that position, it will be after the fourth time T4. Because the system had predicted that the deer 650 will have moved past the first road 602 by then, no alert is now issued.

Figure 7:
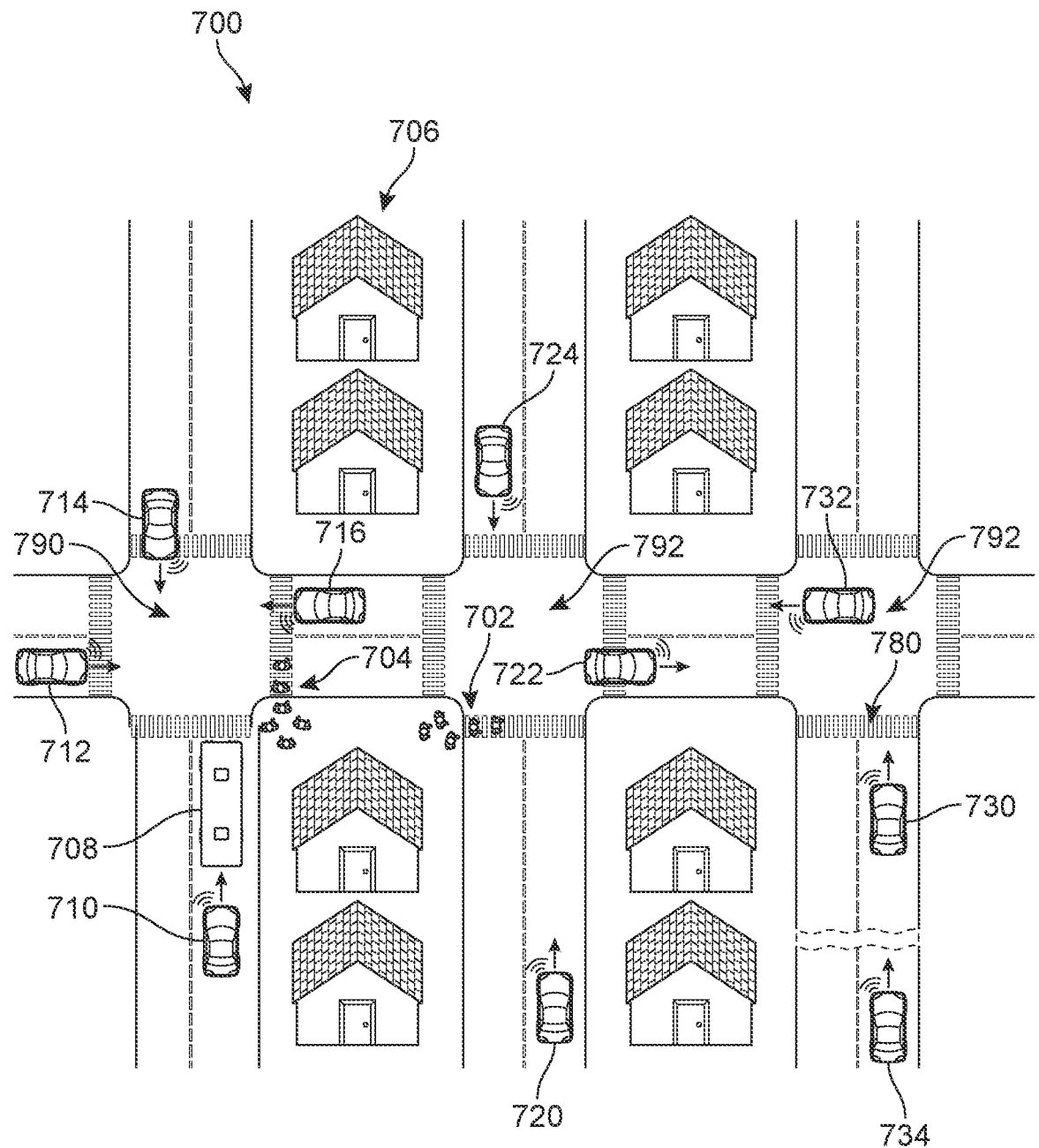
FIG. 7 is a schematic view of a scenario where vehicles in a city neighborhood can be alerted when children will be crossing near the vehicle.

In order to better appreciate the various contexts in which the proposed systems may be implemented, FIG. 7 illustrates a scenario in which driver alerts are presented in an urban setting. Specifically, a city neighborhood 700 with houses 706 is shown in which a series of roadways intersect and several vehicles travel in different directions. Furthermore, obstacles corresponding to two groups of children crossing the road are shown, including a first group 702 and a second group 704. As the children "objects" emerge from a bus 708, several sensor-enabled vehicles within range of the objects detect the presence of these dynamically moving objects and determine whether these objects can potentially affect roadway conditions for their own vehicles and other vehicles.

For example, sensors installed on each of a first vehicle 710, a second vehicle 712, a third vehicle 714, and a fourth vehicle 716 proximate a first roadway intersection 790 closest to the bus 708 can collect data about the first group 704 as the first group 704 crosses a road in the first roadway intersection 790. Similarly, sensors installed on each of the fourth vehicle 716, a fifth vehicle 724, and a sixth vehicle 722 proximate a second roadway intersection 792 as the second group 702 crosses a road in the second roadway intersection 792. This data is shared with nearby vehicles, including the other sensor-enabled vehicles providing data, as well as cars outside the immediate range of the current location of each obstacle, such as a seventh vehicle 720, an eighth vehicle 732, a ninth vehicle 730, and a tenth vehicle 734.

Thus, as the driver alert systems associated with or accessible by each vehicle receive the data, predicted paths for each group are determined, and for those vehicles that are expected to pass through one or both of the predicted paths, an alert and/or alternate route guidance can be presented. For example, seventh vehicle 720 is approaching the second roadway intersection 792 and its driver presented with an alert that children (first group 702) are crossing the road at an intersection directly ahead. Since no detours are available, no alternate route guidance may be offered. In contrast, as the eighth vehicle 732 approaches the first roadway intersection 790, its driver can be presented with an alert that children (second group 704) are crossing the road at an intersection two blocks ahead. However, because a cross-street is available prior to this intersection event, a detour is possible, and the system may present the driver alternate route guidance in this case. In addition, because ninth car 730 will be past a third roadway intersection 794 prior to the predicted arrival of the first group 702 at the upcoming crosswalk, no alert is presented to the driver. In contrast, as tenth vehicle 734 is at a greater distance from the third roadway intersection 794, and is estimated to arrive coincident with the predicted movement of the first group 702 into upcoming crosswalk 780, an alert and/or alternate route guidance may be presented to the driver.

As noted earlier, in different embodiments, the alerts shown to a driver can be configured to reflect a wide range of information and warning levels. Such layered presentation of information is desired in order to minimize the distraction of the alert(s) to a driver, and decrease the area being overlaid by visual indicators and possibly obstructing the view of the road. FIGS. 8A-11D depict several examples of visual indicators that may be used by a driver alerts system.

Figure 8A:
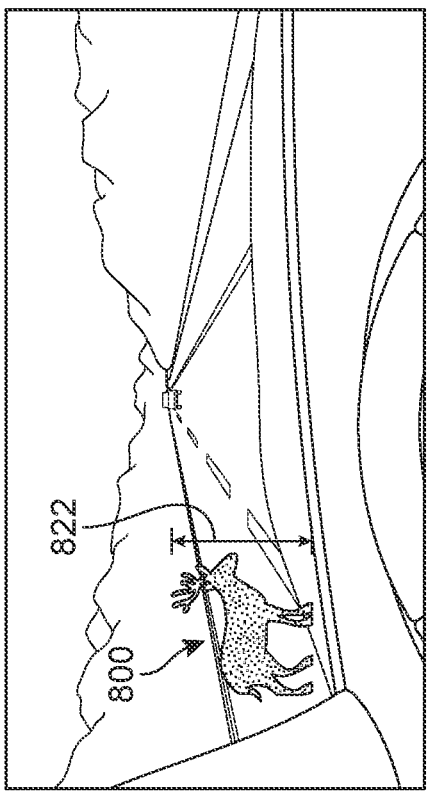
FIGS. 8A-8D are examples of an alert that changes size in response to changes in proximity to a predicted intersection event, according to an embodiment.
Figure 8B:
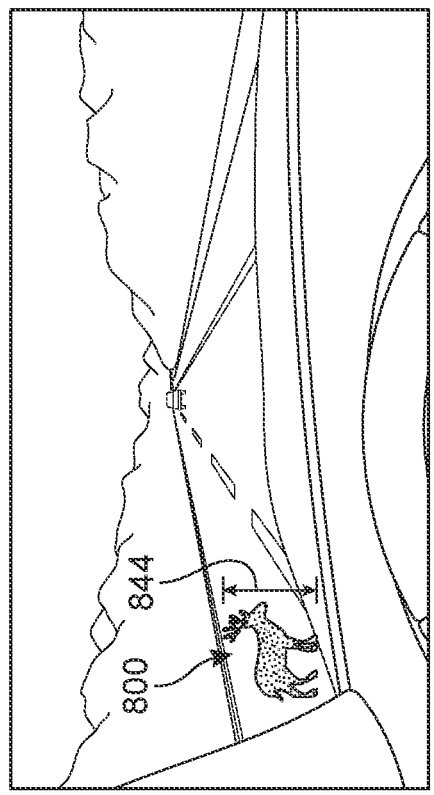
Figure 8C:
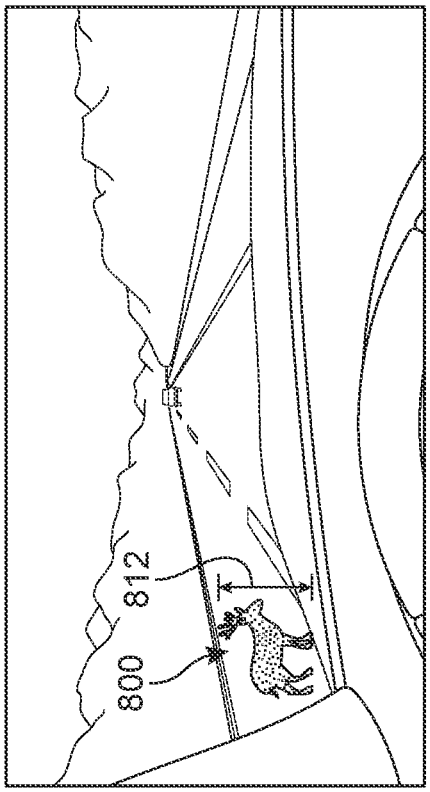
Figure 8D:
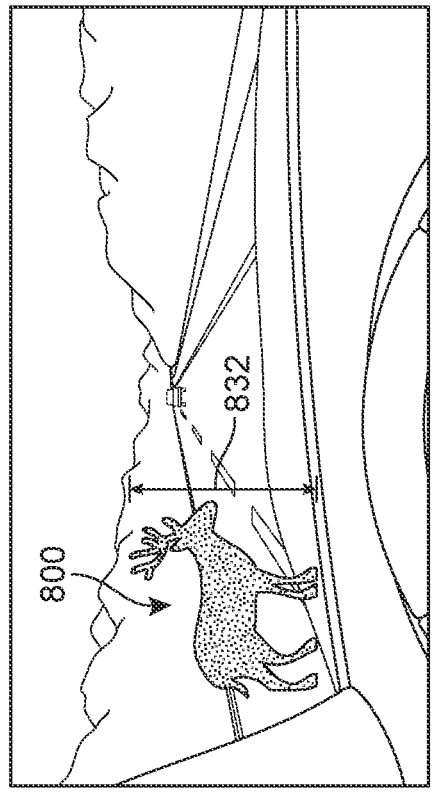

In FIGS. 8A-8D, a sequence of alerts for a deer are represented for a period of time extending from a first time T1 to a second time T2 to a third time T3 to a fourth time T4 on a head-up display for a vehicle. In FIG. 8A, at first time T1, the predicted intersection zone between the vehicle and the deer is at a first proximity relative to the vehicle. In FIG. 8B, at second time T2, the vehicle has moved forward and the predicted intersection zone between the vehicle and the deer is at a second proximity relative to the vehicle that is greater (nearer) than the first proximity. In order to represent this decrease in distance, an alert 800 has increased in size from a first size 812 to a second size 822. In FIG. 8C, at third time T3, the vehicle has moved forward and the predicted intersection zone between the vehicle and the deer is at a third proximity relative to the vehicle that is greater (nearer) than the second proximity. In order to represent this further decrease in distance, the alert 800 has increased in size to a third size 832 that is larger than the second size 822. Finally, in FIG. 8D, at fourth time T4, the vehicle has moved forward, but the data has been updated as described earlier herein. As a result, the predicted intersection zone has changed and is now positioned further away, such that the distance between the vehicle and the deer is greater, at a fourth proximity relative to the vehicle that is similar to the first proximity. In order to represent this increase in distance, the alert 800 has decreased in size from third size 832 to a fourth size 842. While proximity (distance) is used as a reference in this example and other below (see FIGS. 9A-10D), it will be appreciated that a similar type of presentation may be used based on the window of time remaining before the intersection event (i.e., a decreasing window of time vs. an increasing window of time) where larger alerts are shown as the window of time decreases.

In different embodiments, changes in the proximity to a predicted intersection event can also or alternatively be represented by corresponding changes in appearance of the alert. In FIGS. 9A-9D, a sequence of alerts for a deer are again represented for a period of time extending from a first time T1 to a second time T2 to a third time T3 to a fourth time T4 on a head-up display for a vehicle. In FIG. 9A, at first time T1, the predicted intersection zone between the vehicle and the deer is at a first proximity relative to the vehicle. In FIG. 9B, at second time T2, the vehicle has moved forward and the predicted intersection zone between the vehicle and the deer is at a second proximity relative to the vehicle that is greater (nearer) than the first proximity. In order to represent this decrease in distance, an alert 900 changes from a first appearance type 910 (corresponding to a level of brightness and/or color and/or degree of translucence and/or fill type) to a second appearance type 920 (corresponding to a more prominent, noticeable, conspicuous, and/or obtrusive level of brightness and/or color and/or degree of translucence and/or fill type). For example, the second appearance type 920 may be brighter and/or more solid than the first appearance type 910. In some embodiments, the more prominent alert may be accompanied by an audio alert, such as a beeping, and the sound may increase as the obstacle grows nearer. In FIG. 9C, at third time T3, the vehicle has moved forward and the predicted intersection zone between the vehicle and the deer is at a third proximity relative to the vehicle that is greater (nearer) than the second proximity. In order to represent this further decrease in distance, the alert 900 has changed from the second appearance type 920 to a third appearance type 930 that is associated with a more prominent, noticeable, conspicuous, and/or obtrusive level of brightness and/or color and/or degree of translucence and/or fill type than the second appearance type 920. In some embodiments, the alert 900 may begin blinking to underscore the proximity of the expected obstacle. Finally, in FIG. 9D, at fourth time T4, the vehicle has moved forward, but the data has been updated as described earlier herein. As a result, the predicted intersection zone has changed and is now positioned further away, such that the distance between the vehicle and the deer is greater, at a fourth proximity relative to the vehicle that is similar to the first proximity. In order to represent this increase in distance, the alert 900 has a fourth appearance type 940 that is associated with a less noticeable, conspicuous, and/or obtrusive level of brightness and/or color and/or degree of translucence and/or fill type than the third appearance type 930.

Figure 10A:
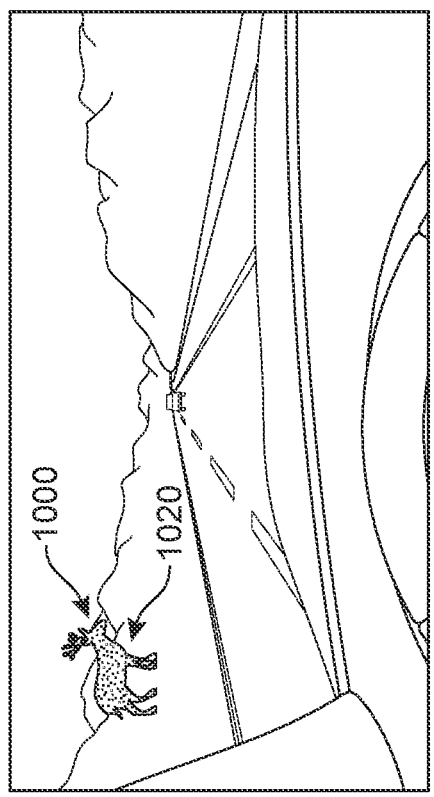
FIGS. 10A-10D are examples of an alert that changes position in response to changes in proximity to a predicted intersection event, according to an embodiment.
Figure 10B:
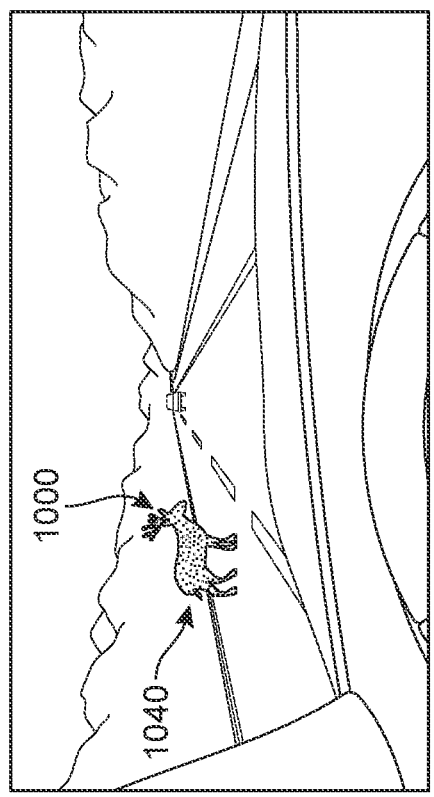
Figure 10C:
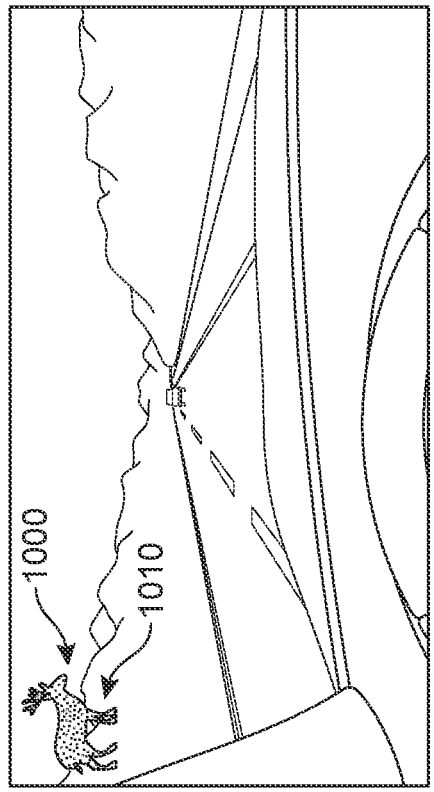
Figure 10D:
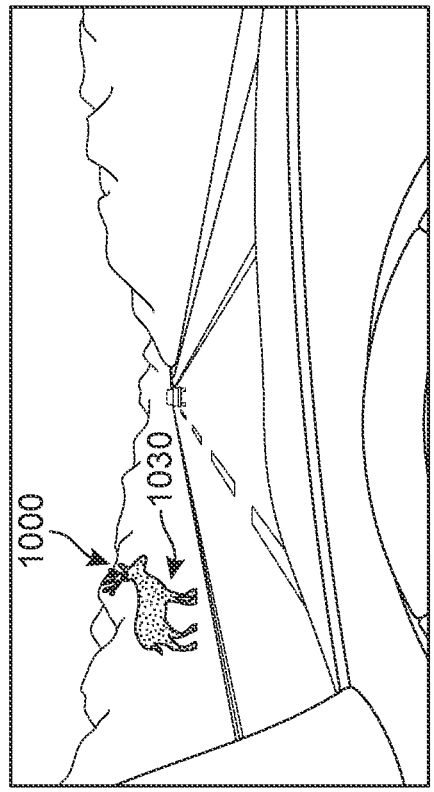

In some other embodiments, changes in the proximity to a predicted intersection event can also or alternatively be represented by corresponding changes in the displayed position of the alert. In FIGS. 10A-10D, a sequence of alerts for a deer are also represented for a period of time extending from a first time T1 to a second time T2 to a third time T3 to a fourth time T4 on a head-up display for a vehicle. In FIG. 10A, at first time T1, the predicted intersection zone between the vehicle and the deer is at a first proximity relative to the vehicle. In FIG. 10B, at second time T2, the vehicle has moved forward and the predicted intersection zone between the vehicle and the deer is at a second proximity relative to the vehicle that is greater (nearer) than the first proximity. In order to represent this decrease in distance, an alert 1000 changes from a first position 1010 (near to an outermost periphery of the field of view of the display, what would be a least noticeable area to a driver) to a second position 1020 that is disposed relatively nearer to a center of the field of view of the display (corresponding to a more noticeable, conspicuous, and/or obtrusive location). In FIG. 10C, at third time T3, the vehicle has moved forward and the predicted intersection zone between the vehicle and the deer is at a third proximity relative to the vehicle that is greater (nearer) than the second proximity. In order to represent this further decrease in distance, the alert 1000 has moved from the second position 1020 to a third position 1030 that is closer to a center of the field of view than the second position 1020, and is associated with a more noticeable, conspicuous, and/or obtrusive location. Finally, in FIG. 9D, at fourth time T4, the vehicle has moved forward, and the predicted intersection zone is much nearer, at a fourth proximity relative to the vehicle that is greater than the third proximity. In order to represent this decrease in distance, the alert 1000 has a fourth position 1040 that is disposed further toward a center of the display, associated with a more noticeable, conspicuous, and/or obtrusive location for the driver. In some embodiments, the alert 1000 can be disposed directly at the center of the display to indicate an imminent intersection event. It should be understood that each of the above implementations (FIGS. 8A-10D) can be used in isolation or in combination to indicate various types of information and warning levels to a driver.

Figure 11C:
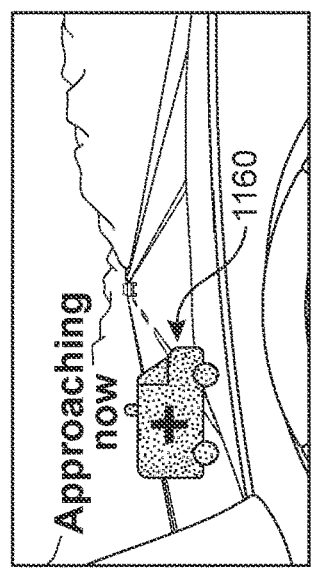
FIGS. 11A-11F are examples of possible alerts representing various types of objects, according to an embodiment.
Figure 11B:
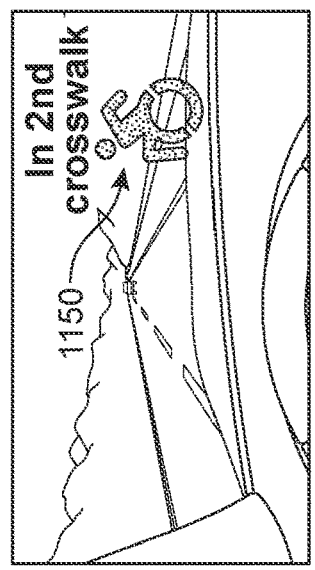
Figure 11A:
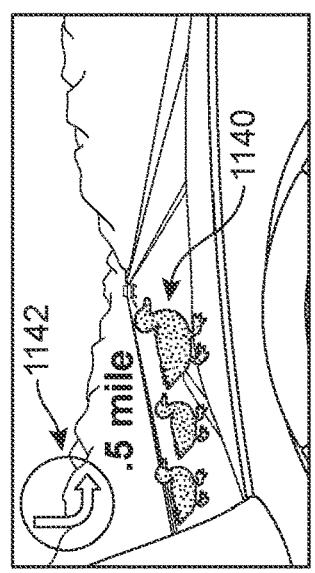
Figure 11F:
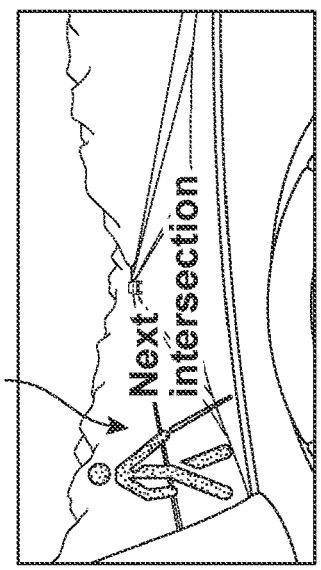
Figure 11E:
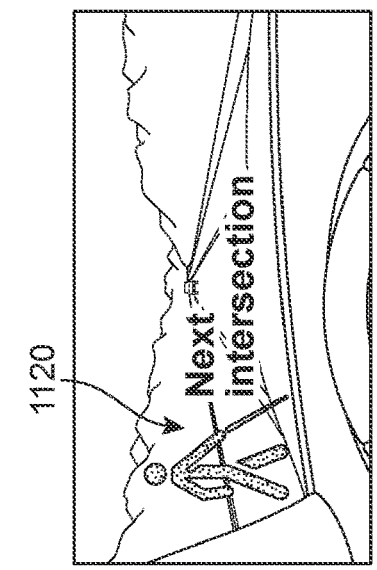
Figure 11D:
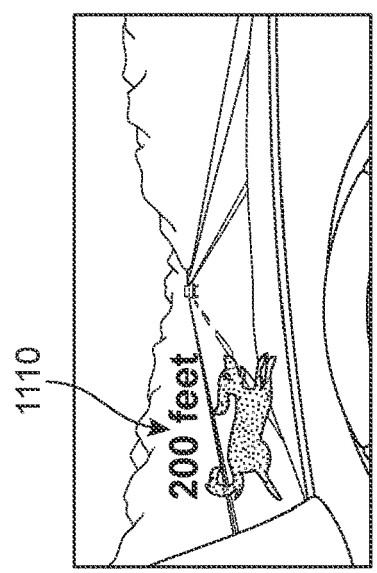

Referring next to FIGS. 11A-11D, a series of examples of possible image recognition classification results and corresponding alert indicators that may be presented via an AR-enabled vehicle display are illustrated. In FIG. 11A, a first alert 1110 is a dog-shaped symbol that is positioned toward a left side of the display to indicate the direction from which the obstacle is approaching. In some embodiments, additional information such as a distance remaining (here "200 feet") is also shown. In FIG. 11B, a second alert 1120 is a pedestrian-shaped symbol with a cane, indicating detection of a person who may be visually impaired. In some embodiments, additional information such as a reference message may also be presented (here "Next intersection"). In FIG. 11C, a third alert 1130 is a symbol of a pedestrian with a car, indicating a possible jaywalker. In some embodiments, such a symbol can be presented in combination with a window of time until the predicted intersection event (here "30 seconds"). In FIG. 11D, a fourth alert 1140 is a symbol of a duck and ducking family toward the middle of the display to indicate the ducks are currently crossing the roadway ahead, and a notice that the predicted intersection zone is at a distance of 0.5 mile away. In some embodiments, an additional or alternate indicator 1142 can be displayed in which a driver may be notified that there is alternate route guidance available to detour around the potential obstacle. In some embodiments, the indicator 1142 can depict a suggested alternate route map, and/or an image representing the first step in the alternate route. In FIG. 11E, a fifth alert 1150 is a wheelchair-shaped symbol that is positioned toward the right side if the display to indicate the direction from which the obstacle is approaching, along with a reference message "In $2^{nd}$ crosswalk". Finally, in FIG. 11F, a sixth alert 1160 is an ambulance-shaped symbol, with a message "Approaching now" to indicate the imminent intersection event between the vehicle and the detected ambulance.

Figure 12:
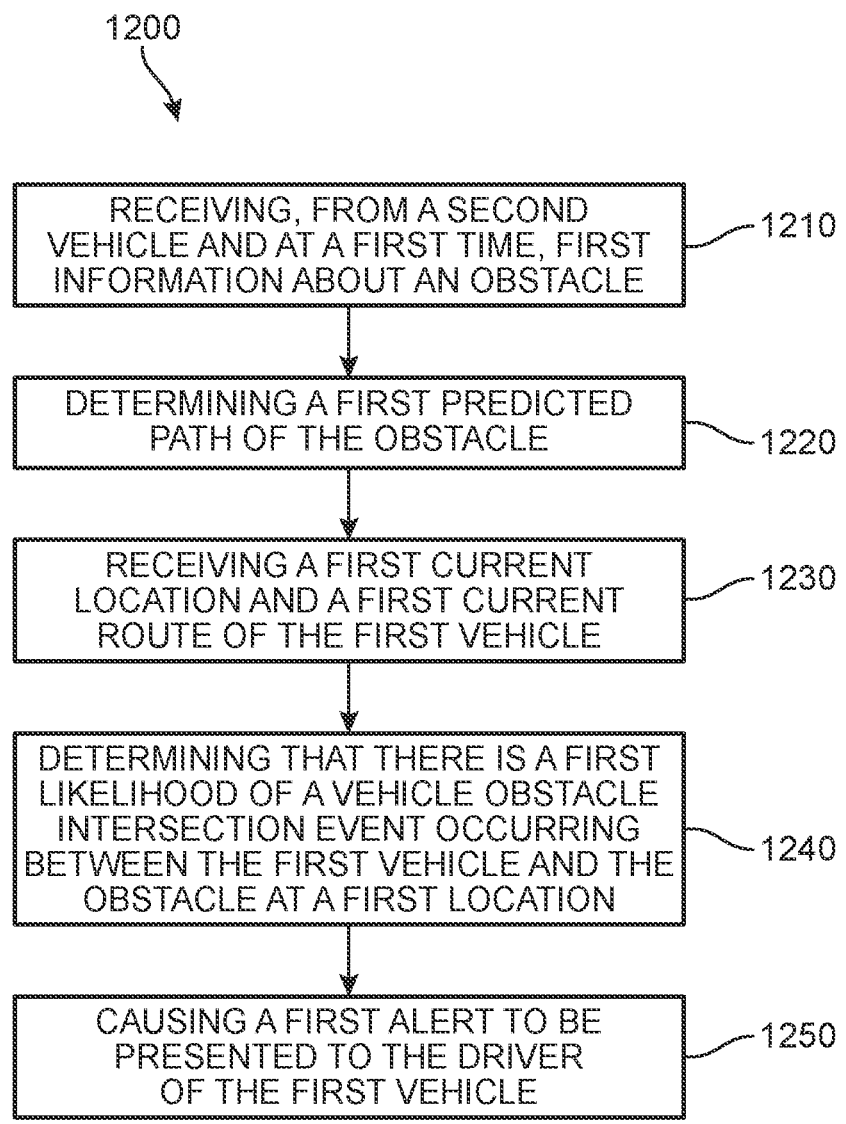
FIG. 12 is a flow chart depicting a process of alerting a driver of a vehicle of an upcoming obstacle, according to an embodiment.

FIG. 12 is a flow chart illustrating an embodiment of a method 1200 of presenting alerts to a driver of a first vehicle based on data collected by a different, second vehicle. In a first step 1210, the method 1200 includes receiving, from a second vehicle and at a first time, first information about an obstacle associated with an environment outside of the second vehicle around the first time. This environment can refer to an external physical world surrounding the second vehicle at its current location (or its location when it collected the data being received), where this environment is in the range of some or all of the sensors associated with the second vehicle. A second step 1220 includes determining, based on the first information, a first predicted path of the obstacle, and a third step 1230 includes receiving a first current location and a first current route of the first vehicle. In a fourth step 1240 the method 1200 includes determining, based at least on the first current location and first current route of the first vehicle and the first predicted path of the obstacle, that there is a first likelihood of a vehicle obstacle intersection event occurring between the first vehicle and the obstacle at a first location. A fifth step 1250 includes causing, in response to the determination of the first likelihood of a vehicle obstacle intersection event occurring, a first alert to be presented to the driver of the first vehicle.

In other embodiments, the method may include additional steps or aspects. In one embodiment, the first alert comprises a visual indicator displayed to the driver and/or an audio alert emitted to the driver, and in another embodiment, the first alert is a visual indicator corresponding to a category representing a type of the obstacle. As another example, in some embodiments, the first information from the second vehicle is received by the first vehicle via a vehicle-to-vehicle network.

In some embodiments, the method further includes one or more steps such as receiving, from a third vehicle and at a second time subsequent to the first time, second information about the obstacle, the obstacle being associated with an environment outside of the third vehicle around the second time, then determining, based on the second information, a second predicted path of the obstacle. The method may also include receiving a second current location and a second current route of the first vehicle, determining, based at least on the second current location and second current route of the first vehicle and the second predicted path of the obstacle, that there is a second likelihood of the vehicle obstacle intersection event occurring at a second location, and causing, in response to the determination of the second likelihood of a vehicle obstacle intersection event occurring, a second alert to be presented to the driver of the first vehicle. In one example, the second location is closer to the first vehicle than the first location, and the second alert is more prominent than the first alert. In another example, the first alert is a visual indicator presented near a periphery of a field of view of a display, a projected interval of time until the occurrence of the vehicle obstacle intersection event has decreased between the first time and the second time, and/or the second alert is presented nearer to a center of the field of view of the display than the first alert. In some embodiments, where the second location is farther from the first vehicle lower than the first location, the second alert will be less prominent than the first alert.

In some embodiments, the method may further include the step of causing to be generated, in response to the determination of the first likelihood of a vehicle obstacle intersection event occurring, a first alternate route for the first vehicle that avoids the first location around the second time. In other embodiments, the method includes receiving, from a third vehicle around the first time, second information about the obstacle, the obstacle being associated with an environment outside of the third vehicle around the first time, where the first predicted path is further based on the second information.

Other methods can also be contemplated within the scope of this disclosure. For example, a method of providing a driving route for a vehicle may be provided. The method can include a first step of receiving, from a second vehicle and at a first time, first information about an obstacle associated with an environment outside of the second vehicle around the first time, and a second step of determining, based on the first information, a first predicted path of the obstacle. The method can further include a third step of receiving a first current location and a first current route of the first vehicle, and a fourth step of determining, based at least on the first current location and first current route of the first vehicle and the first predicted path of the obstacle, that there is a first likelihood of a vehicle obstacle intersection event occurring between the first vehicle and the obstacle at a first location at a second time subsequent to the first time. A sixth step can include causing to be generated, in response to the determination of the first likelihood of a vehicle obstacle intersection event occurring, a first alternate route for the first vehicle that avoids the first location around the second time, and a seventh step of providing an indicator to the driver that the first alternate route is available and may be accessed by the driver.

In other embodiments, the method may include additional steps or aspects. In one embodiment, the method also includes presenting some or all of the first alternate route to the driver, for example, as step-by-step route guidance or navigation. In another embodiment, receiving the first current location of the first vehicle includes receiving GPS information. In some examples, the method may also involve steps of receiving, from a third vehicle and at a second time subsequent to the first time, second information about the obstacle, the obstacle being associated with an environment outside of the third vehicle around the second time, followed by a step of determining, based on the second information, a second predicted path of the obstacle. The method may then include receiving a second current location and a second current route of the first vehicle, determining, based at least on the second current location and second current route of the first vehicle and the second predicted path of the obstacle, that there is a second likelihood of the vehicle obstacle intersection event occurring at a second location at a third time subsequent to the first time, and causing to be generated, in response to the determination of the second likelihood of a vehicle obstacle intersection event occurring, a second alternate route for the first vehicle that avoids the second location around the third time. In some embodiments, the method may include receiving, from a third vehicle around the first time, second information about the obstacle, the obstacle being associated with an environment outside of the third vehicle around the first time, where the first predicted path is further based on the second information.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of intelligently generating alerts to a driver of a first vehicle, the method comprising:
receiving, from a second vehicle and at a first time, first information about a dynamic obstacle assigned a first classification type present in an environment outside of the second vehicle around the first time;
receiving, from a third vehicle around the first time, second information about the obstacle present in an environment outside of the third vehicle around the first time;
determining, based on the first information and the second information, a first predicted path of the obstacle;
receiving a first current location and a first current route of the first vehicle;
determining, based at least on the first current location and first current route of the first vehicle and the first predicted path of the obstacle, that there is a first likelihood of a vehicle obstacle intersection event occurring between the first vehicle and the obstacle within a first period of time; and
causing, in response to the determination of the first likelihood of a vehicle obstacle intersection event occurring, a visual indicator alerting the driver about the obstacle to appear on an augmented reality (AR)-enabled display of the first vehicle, the visual indicator having a shape representing the first classification type.

2. The method of claim 1, wherein the obstacle is an animal, and the visual indicator has a shape of an animal.

3. The method of claim 1, wherein the obstacle is a child, and the visual indicator is in the shape of a child.

4. The method of claim 1, wherein the visual indicator is overlaid on a head-up display.

5. The method of claim 4, wherein the head-up display is configured to project the visual indicator on a windscreen of the first vehicle.

6. The method of claim 5, wherein the visual indicator is substantially transparent such that occupants of the first vehicle can clearly observe outside of the vehicle through the windscreen.

7. The method of claim 1, further comprising causing an audio alert to be emitted in the first vehicle during presentation of the visual indicator.

8. The method of claim 1, wherein the first information also includes GPS information of the obstacle.

9. The method of claim 1, wherein the visual indicator becomes increasingly prominent as the first vehicle approaches the obstacle.

10. A computer-implemented method of intelligently generating alerts to a driver of a first vehicle, the method comprising:

receiving, from a second vehicle and at a first time, first information about a dynamic obstacle associated with an environment outside of the second vehicle around the first time;

receiving, from a third vehicle around the first time, second information about the obstacle present in an environment outside of the third vehicle around the first time;

determining, based on the first information and the second information, a first predicted path of the obstacle;

receiving a first current location and a first current route of the first vehicle;

determining, based at least on the first current location and first current route of the first vehicle and the first predicted path of the obstacle, that there is a first likelihood of a vehicle obstacle intersection event occurring between the first vehicle and the obstacle within a first period of time; and causing, in response to the determination of the first likelihood of a vehicle obstacle intersection event occurring, a visual indicator recommending an alternate route to the driver to appear on an augmented reality (AR)-enabled display of the first vehicle.

11. The method of claim 10, wherein the visual indicator is a directional arrow.

12. The method of claim 10, wherein the visual indicator becomes increasingly prominent as the first vehicle approaches the obstacle.

13. The method of claim 10, further comprising causing an audio alert to be emitted in the first vehicle during presentation of the visual indicator.

14. A system for intelligently generating alerts to a driver of a first vehicle, the system comprising a processor and a non-transitory computer-readable storage medium including instructions which, when executed by the processor, cause the processor to:

receive, from a second vehicle and at a first time, first information about a dynamic obstacle associated with an environment outside of the second vehicle around the first time;

receive, from a third vehicle around the first time, second information about the obstacle present in an environment outside of the third vehicle around the first time;

determine, based on the first information and the second information, a first predicted path of the obstacle;

receive a first current location and a first current route of the first vehicle;

determine, based at least on the first current location and first current route of the first vehicle and the first predicted path of the obstacle, that there is a first likelihood of a vehicle obstacle intersection event occurring between the first vehicle and the obstacle within a first period of time; and cause, in response to the determination of the first likelihood of a vehicle obstacle intersection event occurring, a visual indicator alerting the driver about the obstacle to appear on an augmented reality (AR)-enabled display of the first vehicle, the visual indicator having a shape representing the first classification type.

15. The system of claim 14, wherein the visual indicator is overlaid on a head-up display.

16. The system of claim 15, wherein the head-up display is configured to project the visual indicator on a windscreen of the first vehicle.

17. The system of claim 16, wherein the visual indicator is substantially transparent such that occupants of the first vehicle can clearly observe outside of the vehicle through the windscreen.

18. The system of claim 14, wherein the instructions further cause the processor to cause an audio alert to be emitted in the first vehicle during presentation of the visual indicator.

19. The system of claim 14, wherein the first information also includes GPS information of the obstacle.

20. The system of claim 14, wherein the visual indicator becomes increasingly prominent as the first vehicle approaches the obstacle.

* * * * *